United States Patent [19]

Bass et al.

[11] Patent Number: 4,888,490
[45] Date of Patent: Dec. 19, 1989

[54] OPTICAL PROXIMITY APPARATUS AND METHOD USING LIGHT SOURCES BEING MODULATED AT DIFFERENT FREQUENCIES

[75] Inventors: Michael Bass, Winter Springs, Fla.; Stephen M. Copley, Palos Verdes Estates, Calif.

[73] Assignee: University of Southern California, Los Angeles, Calif.

[21] Appl. No.: 197,854

[22] Filed: May 24, 1988

[51] Int. Cl.$^4$ ............................................. G01N 21/86
[52] U.S. Cl. ................................. 250/561; 250/201; 356/1
[58] Field of Search .................... 250/221, 222.1, 560, 250/561, 201 AF; 356/1, 4; 354/403

[56] References Cited

U.S. PATENT DOCUMENTS

| | | | |
|---|---|---|---|
| 3,187,185 | 6/1965 | Milnes | 250/222.1 |
| 3,424,531 | 1/1969 | Bender | 356/4 |
| 3,741,654 | 6/1973 | Brenholdt | 356/4 |
| 3,832,056 | 8/1974 | Shipp et al. | 250/221 |
| 3,900,260 | 8/1975 | Wendt | 356/1 |
| 4,236,819 | 12/1980 | Green | 356/4 |
| 4,356,393 | 10/1982 | Fayfield | 250/221 |
| 4,639,140 | 1/1987 | Lerat | 356/4 |

OTHER PUBLICATIONS

Osada, Hideharu & Shimokohbe, Akira, "An Optical Non-Contacting Probe," 1984.
Kanade, Takco & Sommer M., Thomas, "An Optical Proximity Sensor for Measuring Surface Position and Orientation for Robot Manipulation," Robotics Institute Carnegie-Mellon University.
Mottier, F. M., "Automatic Workpiece Surface Tracker for Laser Cutter," *SPIE*, vol. 220 Optics in Metrology and Quality Assurance, 1980.
Burns, Richard H. & Crabtree, Kenneth, "Heterodyne Laser Beam Position Sensor," Feb., 1978.

*Primary Examiner*—David C. Nelms
*Assistant Examiner*—Stephone B. Allen
*Attorney, Agent, or Firm*—Pretty, Schroeder, Brueggemann & Clark

[57] ABSTRACT

Optical proximity apparatus, and a related method, for monitoring the proximity and angular orientation of a surface and for maintaining that surface in a desired relative position. The apparatus directs two coplanar beams of modulated light onto the surface such that they converge toward a central axis and reach the axis at the point where it intersects the surface's desired position. Two photodetectors receive light scattered from the surface along two detection axes, in the plane of the two modulated beams and on opposite sides of, and equidistant from, the central axis. The relative intensities of the two separate modulated beams received by the two photodetectors can be determined and suitably analyzed to determine the surface's actual proximity and angular orientation relative to its desired position.

19 Claims, 2 Drawing Sheets

OPTICAL PROXIMITY APPARATUS AND METHOD USING LIGHT SOURCES BEING MODULATED AT DIFFERENT FREQUENCIES

BACKGROUND OF THE INVENTION

This invention relates generally to optical proximity apparatus, and related methods, for determining the proximity and angular orientation of a target surface, without actually contacting the surface, and, more particularly, to optical proximity apparatus and methods in which two or more beams of light are directed onto the surface at oblique angles relative to each other.

Apparatus of this kind are useful in many applications where surfaces must be precisely positioned and, in some instances, angularly oriented, without actually being contacted by the apparatus. Many examples of such optical proximity apparatus are found in various manufacturing industries, where products must be precisely oriented, for example, for machining, welding and painting, as well as many other manufacturing processes.

The apparatus frequently direct a number of separate beams of light onto the surface at oblique angles, and the surface's proximity and angular orientation relative to the apparatus is determined by detecting the points at which the separate beams impinge on it. In some of such applications, the separate beams are directed at the surface sequentially, so that it can be readily determined which of the light spots on the surface result from each beam. Although such apparatus are generally effective in detecting the surface's position, it is not believed to provide as precise a proximity and angular orientation determination as is possible in all applications. This is because the surface can sometimes move, even if only slightly, before the positions of all of the beam spots have been detected and analyzed.

Many apparatus of this kind also require the use of two-dimensional photodetectors capable of measuring the x-y coordinates of each spot of light. Although such apparatus are generally effective in detecting the positions of the light beam spots, the photodetectors and their associated circuitry are believed to be unduly expensive.

It should, therefore, be appreciated that there is a need for a more precise, yet simplified and less expensive apparatus and related method for optically monitoring the proximity and, in some instances, the angular orientation, of a surface. The present invention fulfills this need.

SUMMARY OF THE INVENTION

This invention is embodied in an optical proximity apparatus, and related method, for monitoring the proximity of a surface by directing two or more beams of light simultaneously onto the surface and detecting their points of impingement without the need for a two-dimensional photodetector. The apparatus includes source means for providing first and second beams of light and optical means for directing the two beams simultaneously at the surface. The two beams are coplanar and converge toward each other from opposite sides of a central axis, reaching the axis at the surface's desired position. Photodetector means, positioned adjacent to the surface, detects light scattered from the surface along a first detection axis that is parallel with the central axis and in the same plane as the first and second light beams, and produces a corresponding first detection signal.

In accordance with the invention, the first beam of light is modulated at a first frequency and the second beam of light is modulated at a second, different frequency, and demodulator means demodulates the first detection signal to determine the relative strengths of the first and second modulated beams of light in the light detected by the photodetector means along the first detection axis. Processor means then determines the proximity of the surface of the optical means, based on the relative strength determination made by the demodulator means. Thus, an accurate determination of the surface's proximity is obtained in a straightforward, inexpensive manner, and accuracy is ensured even if the surface is moving.

More particularly, the apparatus of the invention can be used to detect both proximity and angular tilt of the surface relative to the optical means. To this end, the photodetector means further includes means for detecting light scattered from the surface along a second detection axis, parallel with the central axis and in the same plane as the first and second beams of light, but on the opposite side of the central axis from the first detection axis. The resulting second detection signal is then demodulated by the demodulator means, to determine the relative strength of the first and second modulated beams in the light detected along the second detection axis. The processor means further includes means, responsive to the determinations of relative strengths of the first and second beams detected by the photodetector means along both the first and the second detection axes, for determining both the proximity and any angular tilt of the surface about an axis orthogonal to the plane of the first and second modulated beams.

The processor means determines that the surface is closer than desired to the optical means if the strength of the detected first modulated beam exceeds that of the detected second modulated beam in the first detection axis. Conversely, the processor means determines that the surface is further than desired from the optical means if the demodulator means determines that the strength of the detected second modulated beam exceeds that of the detected first modulated beam in the same first detection axis. The processor means determines that the surface is tilted in a first angular direction if the strength of the fist modulated beam detected along either of the first or second detection axes exceeds the strength of the second modulated beam detected along either of the axes, and vice versa for a tilt in the second, opposite angular direction.

Angular tilt of the surface about an axis in the plane of the first and second modulated beams can be determined by providing a duplicate structure oriented substantially perpendicular to the first structure, described above. Such an embodiment would provide complete information about the surface's spatial orientation.

In more detailed aspects of the invention, the beams of light originate from a single laser light source and an associated beam splitter means. The beams all have substantially the same peak intensities, and it is their intensities that are modulated by the modulator means. Motor means can be included for controllably moving the surface relative to the optical means in accordance with the proximity and angular tilt determinations, to position the surface at its desired proximity and angular orientation.

Other features and advantages of the present invention should become apparent from the following description of the preferred embodiments, taken in conjunction with the accompanying drawings, which illustrate by way of example, the principles of the invention.

DESCRIPTION OF THE PREFERRED EMBODIMENTS

Figure 1:
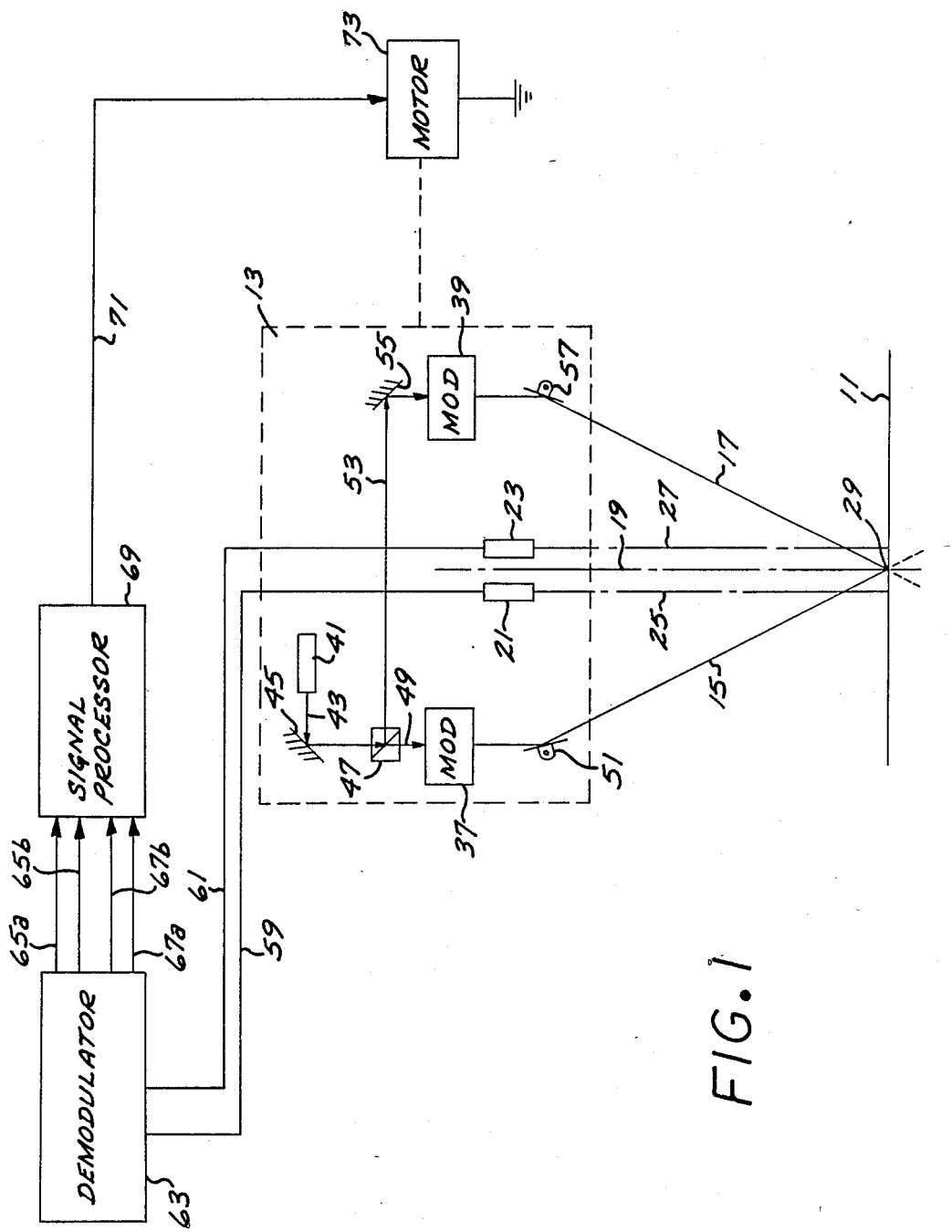
FIG. 1 is a simplified block diagram of a first embodiment of an optical proximity apparatus in accordance with the invention, for positioning a surface in a prescribed spatial orientation.

With reference now to the drawings, and particularly to FIG. 1, there is shown an optical proximity apparatus for monitoring the proximity and angular tilt of a surface 11 and for controllably maintaining the surface in a desired position. The apparatus includes an optical platform 13 on which are mounted various optical elements for projecting first and second coplanar beams of light, designated by the reference numerals 15 and 17, for impingement at oblique angles onto the surface. The first and second light beams converge toward a central axis 19 and reach the axis at the surface's desired location, which is depicted in FIG. 1.

A first photodetector 21 and a second photodetector 23 are mounted on the optical platform 13 and detect light scattered upwardly from the surface 11 along first and second detection axes, identified by the reference numerals 25 and 27, respectively. These detection axes are parallel with the central axis 19 and spaced equidistant and on opposite sides of it, in the plane of the first and second light beams 15 and 17. Collimators (not shown) are associated with each photodetector, to ensure that they receive light only along narrow collimation cones centered on the respective detector axes. These collimation cones are sized such that their edges just barely encompass the central axis at the distances of concern.

When the surface 11 is properly positioned relative to the optical platform 13, the first and second light beams 15 and 17 impinge on the surface at a common point 29, coincident with the central axis 19. Each of the two photodetectors 21 and 23, therefore, receives substantially equal amounts of the portions of the two beams scattered upwardly from the surface.

Figure 2:
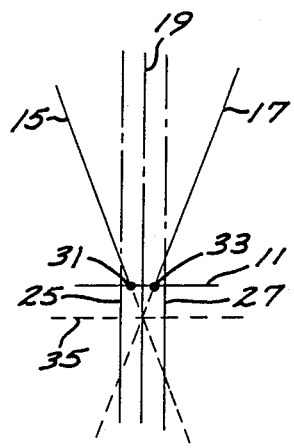
FIG. 2 is a schematic diagram showing the points of impingement on the surface of the first and second beams of light when the surface is located above its desired position.

If the surface 11 is located closer than desired to the optical platform 13, as shown schematically in FIG. 2, then the first and second light beams 15 and 17 will impinge on the surface before they reach the central axis 19. The separate points of impingement of the first and second beams on the surface are indicated by the reference numerals 31 and 33, respectively. Each of the photodetectors 21 and 23 will, therefore, receive from the surface more of one beam than of the other. In particular, the first photodetector 21 will receive more of the first beam 15, and the second photodetector 23 will receive more of the second beam 17. The desired position for the surface is indicated by the dotted line 35.

Figure 3:
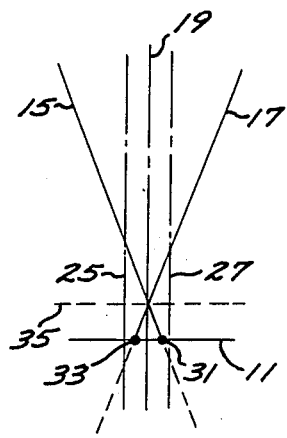
FIG. 3 is a schematic diagram similar to FIG. 2, but showing the points of impingement when the surface is located below its desired position.

Similarly, if the surface 11 is located further than desired from the optical platform 13, as shown schematically in FIG. 3, then the first and second light beams 15 and 17 will impinge on the surface after crossing the central axis 19. The points of impingement of the first and second beams on the surface are again indicated by the reference numerals 31 and 33, respectively. Each of the photodetectors 21 and 23 will, therefore, receive from the surface more of one beam than of the other. In particular, the first photodetector 21 will receive more of the second beam 17, and the second photodetector 23 will receive more of the first beam 15. The desired position for the surface is again indicated by the dotted line 35.

In order for the apparatus to properly distinguish between the surface position examples of FIGS. 1, 2 and 3, it is necessary that the first and second light beams 15 and 17 be distinguishable from each other in some fashion. In accordance with the invention, the beams are distinguished from each other by being intensity modulated at different frequencies, designated frequency A for the first beam 15 and frequency B for the second beam 17. Thus, if one of the photodetectors 21 or 23 detects more light modulated at one frequency (e.g., frequency A) than at the other (e.g., frequency B) it can be deduced that the surface 11 has deviated from its desired position of FIG. 1 to one of the undesired positions of FIGS. 2 or 3.

With reference to FIG. 1, the first beam 15 is intensity modulated by a first modulator 37 and the second beam 17 is intensity modulated by a second modulator 39. The modulating frequencies A and B are preferably on the order of a 3 kilohertz. Alternatively, the first and second beams can be produced directly by separate pulsed laser diodes.

The first and second light beams 15 and 17 originate from a single laser light source 41 mounted on the optical platform 13. The beam 43 emitted by the laser is reflected by a fixed mirror 45 to a beam splitter 47, which splits the beam into two secondary beams of substantially equal intensity. The first of these secondary beams 49 is modulated by the first modulator 37 and, in turn, reflected by an adjustable mirror 51 toward the surface 11, as the first modulated beam 15. Similarly, the second of the two secondary beams 53 output by the beam splitter is reflected by a stationary mirror 55, modulated by the second modulator 39, and, in turn, reflected by an adjustable mirror 57, to impinge on the surface as the second modulated beam 17.

The positions of the adjustable mirrors 51 and 57 are precisely selected so as to direct the first and second beams 15 and 17 at substantially identical oblique angles toward the surface 11, where they will intersect with each other at the common point of impingement 29, coincident with the central axis 19. The oblique angles of the first and second beams can have any convenient value, such as 30 degrees relative to the central axis.

As previously mentioned, the first and second photodetectors 21 and 23 are mounted on the optical platform 13 in positions such that they receive light scattered upwardly from the surface 11 along the first and second detection axes 25 and 27, respectively. These axes are located equidistant from, and on opposite sides of, the central axis 19. Appropriate collimators (not shown) associated with the photodetectors ensure that the light impinging on their active surfaces is received only along narrow collimation cones parallel with the central axis. The collimators also ensure that the beamwidths are sufficiently wide to include the point 29 at which the central axis passes through the surface's desired position (FIG. 1), so that when the surface 11 is properly positioned, both photodetectors receive light from both modulated beams 15 and 17. The first and second photodetectors produce detections signals proportional to the time-varying intensity of light impinging on them, for output on lines 59 and 16, respectively.

A demodulator 63 receives the first and second detection signals on lines 59 and 61, respectively, and detects the amplitudes of the components of the signals that are modulated at the modulation frequencies A and B of the respective first and second light beams 15 and 17. This, of course, indicates the relative amounts of the first and second modulated beams that are received by each photodetector. Appropriate signals indicating the magnitudes of the frequency A and B components in each of the first and second detection signals are output on lines 65a and b and 67a and b, respectively.

A signal processor 69 receives the demodulator signals on lines 65a and b and 67a and b and, based on them, determines the proximity of the surface 11 relative to the optical platform 13. In particular, if the signals received on lines 65a and 65b are equal, indicating that the first photodetector 21 has received equal amounts of the first and second modulated beams 15 and 17, the signal processor determines that the surface is properly positioned at its desired position, as depicted in FIG. 1. On the other hand, if the frequency A signal received on line 65a exceeds the frequency B signal received on line 65b, and if the frequency B signal received on line 67b exceeds the frequency A signal received on line 67a, the signal processor determines that the surface is positioned closer than desired to the platform, as depicted in FIG. 2. Similarly, if the frequency B signal received on line 65b exceeds the frequency A signal received on line 67a, and if the frequency A signal received on line 67a exceeds the frequency B signal received on line 67b, the signal processor determines that the surface is positioned further than desired from the platform, as depicted in FIG. 3.

The signal processor 69 produces a position determination signal indicating the position of the surface 11 relative to the optical platform 13. This signal is transmitted on line 71 to a motor 73 that is configured to move the platform relative to the surface. This forms a feedback control system for controllably positioning the platform so as to maintain the surface in its desired position relative to the platform.

Figure 4:
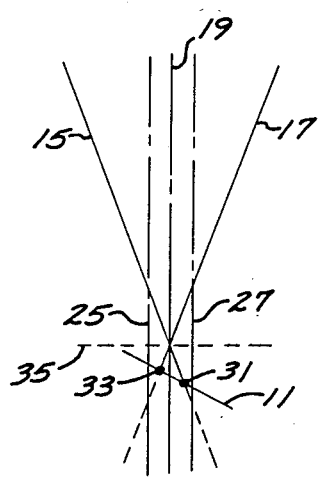
FIG. 4 is a schematic diagram similar to FIGS. 2 and 3, but showing the points of impingement when the surface is tilted in a first angular direction.

The apparatus of FIG. 1 is also adapted to detect and correct for any angular tilt of the surface 11 relative to the optical platform 13. An example of such an angular tilt is depicted in FIG. 4. It will be observed that for the depicted clockwise tilt, the point of impingement 31 of the first modulated beam 15 is located closer to the center of the second photodetector's detection axis 27 than is the point of impingement 33 of the second modulated beam 17 relative to the center of the first photodetector's detection axis 25. As a result, the frequency A signal coupled on line 67a from the demodulator 63 to the signal processor 69 will exceed the frequency B signal coupled on line 67b to signal processor. The signal processor is adapted to recognize such an occurence as an indication that the surface is tilted in this fashion. The signal processor responds by outputting an appropriate signal on line 71 to the motor 73, to effect the desired proximity and angular tilt correction.

It will be appreciated that, in a similar fashion, the signal processor 69 can detect and correct for a clockwise tilt of the surface 11 at a position above the desired position 35, as well as counterclockwise tilts at positions both below and above the desired position.

The surface 11 is depicted in the drawings as being generally planar. It will be appreciated, however, that the apparatus also can properly detect and correct the position of surfaces that are curved.

Figure 5:
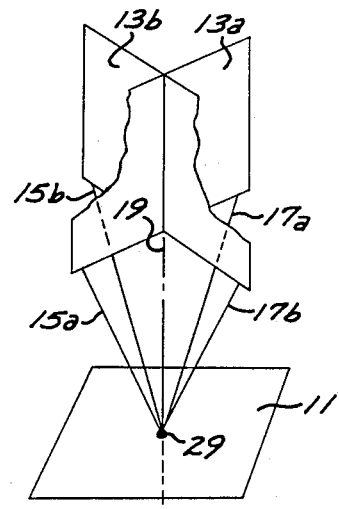
FIG. 5 is a perspective view of a portion of a second embodiment of an optical proximity apparatus in accordance with the invention, for determining the angular tilt of a surface about two orthogonal axes.

FIG. 5 is a partial perspective view of a second embodiment of an optical proximity apparatus in accordance with the invention. This second embodiment includes two optical platforms 13a and 13b oriented substantially perpendicular to each other and each carrying beam splitters, modulators, mirrors and photodetectors corresponding to those of the embodiment of FIG. 1. The elements on these two platforms are used in combination with a demodulator and signal processor (not shown) having similar functions to the corresponding elements of the FIG. 1 embodiment. In this second embodiment, the optical elements located on the first platform 13a operate to detect an angular tilt of the surface 11 about a first axis perpendicular to the first platform 13a, and the optical elements located on the second platform 13b operate to detect an angular tilt of the surface about a second axis, perpendicular to the second platform 13b.

It should be appreciated from the foregoing description that the present invention provides an improved apparatus for monitoring the proximity and angular orientation of a surface and for maintaining that surface in a desired relative position. The apparatus directs two coplanar beams of modulated light onto the surface such that they converge toward a central axis and reach the axis at the point where it intersects the surface's desired position. Two photodetectors receive light reflected from the surface along two detection axes located in the plane of the two modulated beams and on opposite sides of, and equidistant from, the central axis. The relative intensities of the two separate modulated beams received by the two photodetectors can be determined and suitably analyzed to determine the surface's actual proximity and angular orientation relative to its desired position.

Although the present invention has been described in detail with reference to the presently-preferred embodiments, those of ordinary skill in the art will appreciate that various modifications can be made without departing from the invention. Accordingly, the invention is defined only by the following claims.

We claim:

1. Optical proximity apparatus for monitoring the spatial proximity of a surface, comprising:
   first source means for providing a first beam of light modulated at a first frequency;
   second source means for providing a second beam of light modulated at a second frequency, different from the first frequency;
   optical means for directing the first and second modulated beams of light simultaneously at a surface whose spatial proximity is to be monitored, wherein the beams are coplanar and converge toward each other, from opposite sides of a central axis, and wherein the beams both reach the central axis at a desired position of the surface;

photodetector means for detecting light scattered from the surface along a first detection axis parallel with the central axis and in the same plane as the first and second modulated beams of light, and for producing a corresponding first detection signal;

demodulator means for demodulating the first detection signal, to determine the relative strengths of the first and second modulated beams of light in the light detected by the photodetector means along the first detection axis; and processor means, responsive to the relative strength determination made by the demodulator means, for determining the proximity of the surface relative to the optical means.

2. Optical proximity apparatus as defined in claim 1, wherein the processor means determines that the surface is closer than desired to the optical means, if the demodulator means determines that the strength of the detected first beam exceeds the strength of the detected second beam, and that the surface is further than desired from the optical means, if the demodulator means determines that the strength of the detected second beam exceeds the strength of the detected first beam.

3. Optical proximity apparatus as defined in claim 1, and further including motor means, responsive to the relative proximity determination made by the processor means, for controllably moving the surface relative to the optical means, toward its desired position.

4. Optical proximity apparatus as defined in claim 1, wherein:

the apparatus further operates to detect an angular tilt of the surface from an orientation substantially normal to the central axis;

the photodetector means further includes means for detecting light reflected from the surface along a second detection axis, parallel with the central axis and in the same plane as the first and second beams of light, but on the opposite side of the central axis from the first detection axis, and for producing a corresponding second detection signal;

the demodulator means further includes means for demodulating the second detection signal, to determine the relative strengths of the first and second modulated beams of light in the light detected by the photodetector means along the second detection axis;

the processor means determines that the surface is tilted in a first angular direction if the strength of the first beam of light detected by the photodetector means along either of the first or second detection axis exceeds the strength of the second beam of light detected by the photodetector means along either of the first or second detection axes; and the processor means determines that the surface is tilted in a second angular direction, opposite the first angular direction, if the strength of the second beam of light detected by the photodetector means along either of the first or second detection axes exceeds the strength of the first beam of light detected by the photodetector means along either of the first or second detection axes.

5. Optical proximity apparatus as defined in claim 1, wherein:

the first and second source means together include a laser light source for generating a primary beam of light, beam splitter means for splitting the primary beam of light into the first and second beams of light, and modulator means for modulating the first beam of light at the first frequency and the second beam of light at the second frequency;

the first and second beams of light have substantially identical peak intensities; and the first and second modulated beams of light converge on the central axis at substantially identical angles.

6. Optical proximity apparatus as defined in claim 1, wherein:

the photodetector means further includes means for detecting light scattered from the surface along a second detection axis, parallel with the central axis and in the same plane as the first and second beams of light, but on the opposite side of the central axis from the first detection axis, and for producing a corresponding second detection signal;

the demodulator means further includes means for demodulating the second detection signal, to determine the relative strengths of the first and second modulated beams of light in the light detected by the photodetector means along the second detection axis; and the processor means further includes means, responsive to the determination of the relative strengths of the first and second modulated beams of light detected by the photodetector means along both the first and the second detection axes, for detecting any angular tilt of the surface about an axis substantially orthogonal to the plane of the first and second modulated beams of light.

7. Optical proximity apparatus as defined in claim 5, wherein the modulator means modulates the intensities of the first and second beams of light.

8. Optical proximity apparatus as defined in claim 6, wherein the first and second detection axes are located substantially equidistant from the central axis.

9. Optical proximity apparatus as defined in claim 6, wherein:

the apparatus further includes third source means for providing a third beam of light modulated at a third frequency and fourth source means for providing a fourth beam of light modulated at a fourth frequency, different from the third frequency;

the optical means further includes means for directing the third and fourth modulated beams of light at the surface, wherein the third and fourth modulated beams are coplanar and converge toward each other from opposite sides of the central axis, wherein the third and fourth modulated beams both reach the central axis at the desired position of the surface, and wherein the plane of the third and fourth modulated beams is substantially orthogonal to the plane of the first and second modulated beams;

the photodetector means further includes means for detecting light scattered from the surface along third and fourth detection axes parallel with, and on opposite sides of, the central axis and in the plane of the third and fourth modulated beams, and for producing corresponding third and fourth detection signals, respectively;

the demodulator means further includes means for demodulating the third and fourth detection signals and thereby determining the relative strengths of the third and fourth modulated beams of light in the light detected by the photodetector means along both the third and the fourth detector axes; and the processor means further includes means, responsive to the determination of the relative strengths of the third and fourth modulated beams of light detected by the photodetector means along the third and fourth detection axes, for detecting any angular tilt of the surface about an axis substantially orthogonal to the plane of the third and fourth modulated beams of light.

10. A method of monitoring the spatial proximity of a surface, comprising steps of:

providing a first beam of light modulated at a first frequency;

providing a second beam of light modulated at a second frequency, different from the first frequency;

directing the first and second modulated beams of light simultaneously at a surface whose spatial proximity is to be monitored, wherein the beams are coplanar and converge toward each other, from opposite sides of a central axis, and wherein the beams both reach the central axis at a desired position of the surface;

detecting light scattered from the surface along a first detection axis parallel with the central axis and in the same plane as the first and second modulated beams of light, and producing a corresponding first detection signal;

demodulating the first detection signal, to determine the relative strengths of the first and second modulated beams of light in the light detected along the first detection axis; and determining the proximity of the surface relative to the optical means, based on the relative strength determination made in the step of demodulating.

11. A method as defined in claim 10, wherein the step of determining includes substeps of determining that the surface is closer than desired if the step of demodulating determines that the strength of the detected first beam exceeds the strength of the detected second beam, and determining that the surface is further than desired if the step of demodulating determines that the strength of the detected second beam exceeds the strength of the detected first beam.

12. A method as defined in claim 10, and further including a step of controllably moving the surface relative to the optical means, toward its desired position, based on the relative proximity determination made in the step of determining.

13. A method as defined in claim 10, wherein:

the method further detects an angular tilt of the surface from an orientation substantially normal to the central axis;

the step of detecting further includes substeps of detecting light scattered from the surface along a second detection axis, parallel with the central axis and in the same plane as the first and second beams of light, but on the opposite side of the central axis from the first detection axis, and for producing a corresponding second detection signal;

the step of demodulating further includes a step of demodulating the second detection signal, to determine the relative strengths of the first and second modulated beams of light in the light detected along the second detection axis;

the step of determining includes a substep of determining that the surface is tilted in a first angular direction if the strength of the first beam of light detected along either of the first or second detection axes exceeds the strength of the second beam of light detected along either of the first or second detection axes; and the step of determining further includes a substep of determining that the surface is tilted in a second angular direction, opposite the first angular direction, if the strength of the second beam of light detected along either of the first or second detection axes exceeds the strength of the first beam of light detected along either of the first or second detection axes.

14. A method as defined in claim 10, wherein:

the first and second steps of providing together include steps of generating a primary beam of light, splitting the primary beam of light into the first and second beams of light, and modulating the first beam of light at the first frequency and the second beam of light at the second frequency;

the first and second beams of light have substantially identical peak intensities; and the first and second modulated beams of light converge on the central axis at substantially identical angles.

15. A method as defined in claim 10, wherein:

the step of photodetecting further includes substeps of detecting light scattered from the surface along a second detection axis, parallel with the central axis and in the same plane as the first and second beams of light, but on opposite side of the central axis from the first detection axis, and producing a corresponding second detection signal;

the step of demodulating further includes a step of demodulating the second detection signal, to determine the relative strengths of the first and second modulated beams of light in the light detected along the second detection axis; and the step of determining further includes a step of detecting any angular tilt of the surface about an axis substantially orthogonal to the plane of the first and second modulated beams of light, based on the detemination of the relative strengths of the first and second modulated beams of light along both the first and second detection axes.

16. A method as defined in claim 14, wherein the step of modulating modulates the intensities of the first and second beams of light.

17. A method as defined in claim 15, wherein the first and second detection axes are located substantially equidistant from the central axis.

18. A method as defined in claim 15, wherein:

the method further includes steps of providing a third beam of light modulated at a third frequency and providing a fourth beam of light modulated at a fourth frequency, different from the third frequency;

the step of directing further includes a step of directing the third and fourth modulated beams of light at the surface, wherein the third and fourth modulated beams are coplanar and converge toward each other from opposite sides of the central axis, wherein the third and fourth modulated beams both reach the central axis at the desired position of the surface, and wherein the plane of the third and fourth modulated beams is substantially orthogonal to the plane of the first and second modulated beams;

the step of detecting further includes substeps of detecting light scattered from the surface along third and fourth detection axes parallel with, and on opposite sides of, the central axis and in the plane of the third and fourth modulated beams, and producing corresponding third and fourth detection signals, respectively;

the step of demodulating further includes steps of demodulating the third and fourth detection signals and thereby determining the relative strengths of the third and fourth modulated beams of light in the light detected along both the third and the fourth detection axes; and the step of determining further includes a step of detecting any angular tilt of the surface about an axis substantially orthogonal to the plane of the third and fourth modulated beams of light, based on the determination of the relative strengths of the third and fourth modulated beams of light detected in the step of detecting along the third and fourth detection axes.

19. Optical proximity apparatus for monitoring the spatial proximity and angular orientation of a surface, comprising:

a laser light source for generating a primary beam of light;

beam splitter means for splitting the primary beam of light into first and second beams of light having substantially equal intensities;

modulator means for intensity modulating the first beam of light at a first frequency and the second beam of light at a second frequency, different from the first frequency;

optical means for directing the first and second modulated beams of light simultaneously at a surface whose spatial proximity and angular orientation are to be monitored, wherein the beams are coplanar and converge at substantially equal angles toward each other, from opposite sides of a central axis, and wherein the beams both reach the central axis at a desired position of the surface;

photodetector means for detecting light scattered from the surface along both a first detection axis and a second detection axis, parallel with, equidistant from, and on opposite sides of, the central axis and in the same plane as the first and second modulated beams of light, and for producing corresponding first and second detection signals;

demodulator means for demodulating the first and second detection signal, to determine the relative strengths of the first and second modulated beams of light in the light detected by the photodetector means along both the first detection axis and the second detection axis;

processor means, responsive to the relative strength determination made by the demodulator means, for determining the proximity and angular tilt of the surface relative to the optical means;

wherein the processor means determines that the surface is closer than desired to the optical means if the demodulator means determines that the strength of the detected first beam exceeds the strength of the detected second beam, and that the surface is further than desired from the optical means, if the demodulator means determines that the strength of the detected second beam exceeds the strength of the detected first beam;

wherein the processor means determines that the surface is tilted in a first angular direction if the strength of the first beam of light detected by the photodetector means along either of the first or second detection axes exceeds the strength of the second beam of light detected by the photodetector means along either of the first or second detection axes;

and wherein the processor means determines that the surface is tilted in a second angular direction, opposite the first angular direction, if the strength of the second beam of light detected by the photodetector means along either of the first or second detection axes exceeds the strength of the first beam of light detected by the photodetector means along either of the first or second detection axes; and motor means, responsive to the relative proximity and angular tilt determinations made by the processor means, for controllably moving the surface relative to the optical means, toward its desired position and angular orientation.

* * * * *